United States Patent [19]

Fowell

[11] Patent Number: 5,610,848
[45] Date of Patent: Mar. 11, 1997

[54] ROBUST RESONANCE REDUCTION USING STAGGERED POSICAST FILTERS

[75] Inventor: Richard A. Fowell, Culver City, Calif.

[73] Assignee: Hughes Aircraft Company, Los Angeles, Calif.

[21] Appl. No.: 242,582

[22] Filed: May 13, 1994

[51] Int. Cl.⁶ .................................................. G06F 17/10
[52] U.S. Cl. .................. 364/724.07; 364/724.01
[58] Field of Search ........................ 364/724.07, 724.01

[56] References Cited

U.S. PATENT DOCUMENTS

| | | | |
|---|---|---|---|
| 2,801,351 | 7/1957 | Calvert et al. | 307/149 |
| 3,010,035 | 11/1961 | Calvert et al. | 307/152 |
| 4,916,635 | 4/1990 | Singer et al. | 364/513 |
| 5,373,460 | 12/1994 | Marks, II | 364/724.07 |

OTHER PUBLICATIONS

Hyde, James M., et al.; "Using Input Command Pre-Shaping to Suppress Multiple Mode Vibration"; 1991 IEEE International Conference on Robotics and Automation; Apr. 1991, pp. 2604–2609.

Murphy, Brett R., et al.; "Digital Shaping Filters for Reducing Machine Vibration"; IEEE Transactions on Robotics and Automation; vol. 8, No. 2; Apr. 1992; pp. 285–289.

Singer, Neil C., et al.; "Design and Comparison of Command Shaping Methods for Controlling Residual Vibration"; 1989 IEEE Proceedings; Aug. 1989; pp. 888–893.

Singhose, William, et. al.; "Extra–Insenitive Input Shapers For Controlling Flexible Spacecraft"; AIAA Guidance, Navigation and Control Conference, Scottsdale, AZ; Aug. 1–3, 1994; pp. 1122–1130.

Singh, T., et. al.; "Input–Shaped Control of Three–Dimensional Maneuvers of Flexible Spacecraft"; Journal of Guidance, Control, and Dynamics; vol. 16. No. 6, Nov.–Dec. 1993; pp. 1061–1068.

Singh, T., et. al.; "Robust Time–Delay Control"; Journal of Dynamic Systems, Measurement, and Control; Jun. 1993, vol. 115; pp. 303–306.

Tallman, G. H., et. al.; "Analog Study of Dead–Beat Posicast Control"; IRE Transactions on Automatic Control; Mar. 1958; pp. 14–21.

Singhose, William; "A Vector Diagram Approach to Shaping Inputs for Vibration Reduction"; DTIC Technical Report; Mar. 1990; 53 pages.

D. J. Gimpel and J. F. Calvert, "Signal Component Control", AIEE Trans. (Appl. Industry), vol. 71, Nov. 1952, pp. 339–343.

Cook, "Control of Flexible Structures via Posicast", Proceedings of the Eighteenth Southeastern Symposium on System Theory, Apr. 7–8, 1986, pp. 31–35.

Singer, et al., "Shaping Inputs to Reduce Vibration: A Vector Diagram Approach", Proceedings of the 1990 IEEE International Conference on Robotics and Automation, Cincinnati, Ohio, May 13–18, 1990, pp. 922–927.

Loren Slafer, "Attitude and Payload Control System for the Leasat Naval Communications Satellite", Rocky Moutnain Guidance and Control Conference, Feb. 3, 1982, pp. 25–26.

*Primary Examiner*—David H. Malzahn
*Attorney, Agent, or Firm*—Terje Gudmestad; Wanda K. Denson-Low

[57] ABSTRACT

A method for filtering actuator commands for a satellite control system to reduce resonant mode excitation despite uncertain knowledge of the resonance frequencies, due to parameter variations, nonlinearities, and the like. The present method filters the actuator commands with staggered proportional plus delay (posicast) filters having distinct delay values, chosen to provide a desired resonance attenuation over a resonance uncertainty range. The present method may be extended to filter multiple resonances by cascading the staggered filters for each resonance. The present invention has wide application, such as in spacecraft precession and translation maneuvers, as well as gimbaled payload stepping. A particular advantage of the present invention is its direct applicability to fixed-amplitude actuators (such as thrusters and stepper motors), and reduced excitation of resonances at frequencies above those of primary concern.

9 Claims, 3 Drawing Sheets

ROBUST RESONANCE REDUCTION USING STAGGERED POSICAST FILTERS

BACKGROUND OF THE INVENTION

The present invention relates generally to finite impulse response (FIR) filters, and more particularly, to a method of using staggered proportional plus delay, or posicast filters in satellite control systems, and the like, that provides for a reduction in resonances produced in the satellite systems during maneuvers and payload slewing.

The use of finite impulse response (FIR) filters to shape signals to improve system response is known in the art, and has been extensively elaborated. The simplest example is referred to as posicast control, or, in the satellite industry, as a "deadbeat" maneuver. In this method, it is desired to step a system with an undamped resonance of known frequency, without post-maneuver ringing. Half the step command amplitude is applied immediately, and the other half is applied half a resonance period later. The result is that the resonance excitation induced by the first command is canceled by that induced by the second command, resulting in zero net resonance excitation after the maneuver. This process can be thought of as passing the command through a proportional plus delay filter where the gain on both the proportional and the delayed channels is ½. Such a FIR filter is referred to as a "posicast" filter.

The earliest work on posicast filters was cast in a much more general framework. D. J. Gimpel and J. F. Calvert showed in "Signal Component Control", AIEE Trans. (Appl. Industry), Vol 71, Nov. 1952, pp. 339–343, how to design an FIR command filter to reduce multiple resonance modes (which could have damping) to zero in finite time for commands that were polynomial (e.g., step plus ramp plus parabolic). Their approach was to mathematically formulate filter objectives in terms of the filter coefficients, then solve for filter gains and delays. The objective that resonances be nulled in finite time was but one of three objectives they set, and they pointed out that the same technique could be used to realize other objectives as well. This work was included in U.S. Pat. No. 2,801,351, issued to Calvert et al., and the concept of using such filters in various locations in closed loop systems to improve their characteristics as covered in U.S. Pat. No. 3,010,035, issued to Calvert et al.

The effect of damping and of multiple resonant modes on the solution is that posicast filter gains shift slightly in value from ½, and that the command signal must be passed through a series of posicast filters, one for each mode. The appropriate filter gains and delays may be obtained by directly applying Calvert's technique, and the insight presented above is known in the art, and is described by Cook in an article entitled "Control of Flexible Structures via Posicast", Proceedings of the Eighteenth Southeastern Symposium on System Theory, Apr. 7–8, 1986, pp. 31–35.

A disadvantage of the single-delay posicast filter is that it is sensitive to knowledge of resonance frequency. The art described above does not address robustness to frequency range as a design consideration for posicast filters.

U.S. Pat. No. 4,916,635, entitled "Shaping Command Inputs to Minimize Unwanted Dynamics", issued to Singer et al., teaches how to design FIR filters to provide resonance attenuation when the frequencies are uncertain. The method taught therein is to add a requirement to the filter objectives that the derivatives of the output response to changes in the resonance frequency be zero. The filter characteristics are then solved for directly, as taught by Calvert. The resultant filters are directly equivalent to cascading an appropriate posicast filter with itself repeatedly. Calvert's patents are not cited, and posicast techniques are mentioned and dismissed as not being robust. There is no teaching of cascaded posicast filters and no indication that their scheme is functionally equivalent to cascading posicast filters with identical delay times. The filtering schemes of U.S. Pat. No. 4,916,635 are referred to herein as a "repeated posicast" scheme, a "double posicast" or three impulse scheme, and a "triple posicast" or four impulse scheme.

The approach of the Singer patent does not provide a maximal frequency range for a desired level of resonance reduction. An alternative approach that gives up the requirement that the resonance reduction for the nominal resonance be exactly zero in exchange for increasing the frequency range over which a desired level may be achieved, is described by Singer, et. al., in "Shaping Inputs to Reduce Vibration: A Vector Diagram Approach", Proceedings of the 1990 IEEE International Conference on Robotics and Automation, Cincinnati, Ohio, May 13–18, 1990, pp. 922–927. Again, the technique presented is to formulate the problem mathematically, and solve for the filter parameters. The frequency response of such filters resemble those produced by the present invention, and the relationship and differences will be detailed below.

The Singer paper is the closest prior art to the present invention. Both the paper and the present invention have as their goal the reduction in residual vibration magnitude to a prescribed level across a given band of frequencies. Both have as an aim improved dynamic response of flexible spacecraft to maneuvers. Both pass a command signal through a FIR filter to accomplish this end, and both methods produce filters whose frequency response up through a region of specified resonance attenuation is nearly identical.

It is also believed that (non-posicast, infinite impulse response) notch filters, including high-order filters, have been used for command shaping. Such filters take longer to reduce vibration to the level produced by a FIR filter, and are not easily applicable to fixed amplitude actuators, such as thrusters and stepper motors employed in satellite control systems.

Simple posicast control dates back to the 1950s, and posicast techniques have heretofore been used in satellite control systems. One example is precession of spinning satellites. Rather than firing a single pulse to produce a small angular momentum precession, which would excite a nutation resonance to produce nutation equal to the precession, two pulses are used instead, each delivering half of the total desired momentum precession, spaced half a nutation period apart, resulting in zero nutation at the end of the maneuver. In stepper motor controlled gimbaled payloads, a related system is used in a control feedback loop. A error signal is passed through a filter that passes half the signal immediately, and the other half delayed by half of a resonance period of the structural resonance of concern. This proportional plus delay feedback may be viewed as a finite impulse response (FIR) filter that places the first of it's infinite set of zeros at the location of a resonance whose period is twice the period of the filter delay. These technique is referred to as a "deadbeat" control technique, because, in the ideal case, it nulls the system error in finite time. However, there are many types of deadbeat control, and the term "posicast" is a more specific term for the technique of using proportional plus delay filters for the purpose of deadbeat control of second-order oscillators.

One weakness of simple posicast control is that, since it is in some sense a "notch filter" or "zero-pole cancellation"

technique, the effectiveness of its attenuation falls off rapidly as the difference between the expected resonance frequency and the actual frequency grows. An analogous problem arises in designing passive nutation dampers for spacecraft manufactured by the assignee of the present invention. The nutation frequency varies significantly over life, and the nutation damping produced by the passive nutation dampers is highly tuned, acting like a notch filter. An often chosen solution has been to use two nutation dampers having distinct tuned frequencies (e.g., ¼ and ¾ of the way between the low and high end of the expected frequency range. The result is that the desired nutation damping is obtained over a broader range than would be obtained using two dampers at the same frequency. This technique was published in a paper entitled "Attitude and Payload Control System for the Least Naval Communications Satellite" by Loren Slafer, Rocky Mountain Guidance and Control Conference, Feb. 3, 1982.

The Cook article cited above suggests that posicast filters may be cascaded to handle several resonance frequencies. In view of this suggestion, it was believed that the problem of having a range of frequencies where the resonance could exist could be attacked by using two filters at different frequencies to give attenuation that spanned that frequency range. It was also believed that this solution might meet a goal of providing a specified amount of attenuation over as wide a frequency range as possible better than collocating the two filter frequencies, as suggested in the Singer patent.

In view of the above, it is an objective of the present invention to provide for a method of using staggered posicast filters in satellite control systems, and the like, that reduces resonances produced in the satellite systems during maneuvers.

SUMMARY OF THE INVENTION

In order to meet the above and other objectives, the present invention is a method of filtering actuator commands for a satellite control system, for example, to reduce resonant mode excitation despite uncertain knowledge of the resonance frequencies, due to parameter variations, nonlinearities, and the like. The present invention filters the actuator commands with staggered proportional plus delay (posicast) filters having distinct delay values, chosen to provide a desired resonance attenuation over a resonance uncertainty range. The present invention may be extended to filter multiple resonances by cascading the staggered posicast filters for each resonance. The present invention has wide application, such as in spacecraft precession and translation maneuvers, and gimbaled payload stepping.

The present invention achieves the desired level of resonance reduction despite uncertainty in the resonance frequencies. An advantage of the present invention versus prior art is its direct applicability to fixed-amplitude actuators (such as thrusters and stepper motors), and reduced excitation of resonances at frequencies above those of primary concern.

A satellite control system is designed to move a system with a lightly damped resonance(s) of uncertain frequency so there is little residual ringing after the move. More specifically, on an HS-601 satellite, for example, the control system is designed to provide movement commands that perform an east-west translational thruster maneuver without undue excitation of solar panel bending modes. The present invention filters the movement commands through at least two proportional plus delay (posicast) filters with staggered zeros bracketing the expected frequency of the resonance(s) of concern, to provide a desired level of attenuation of any resonance within the frequency uncertainty range.

The present invention thus uses cascaded, staggered, proportional plus delay (posicast) filters to avoid excitation of lightly damped resonances where the delays of the cascaded filters are distinct and the filters are designed to guarantee a desired resonance attenuation over a finite frequency range. While both of these individual elements are described in the prior art references discussed above, the references did not combine the elements in a manner provided by the present invention. Compared to the technique of the Singer et al. patent, the present invention produces a specified, attenuation over an approximately 40% wider frequency band, and produces more attenuation at higher frequencies as well. While the technique of the Singer et al. paper provides a band of similar width, it cannot be easily implemented with quantized output actuators such as stepper motors, since the amplitudes of its impulses are not simple multiples of each other.

The advantages of the present invention versus the method of the Singer paper are that the current invention produces less residual vibration for frequencies above the primary region of interest, and produces signals that are better suited to limited amplitude actuators such as thrusters and stepper motors. These are important advantages, since there are always higher-frequency resonances present, and since thrusters and stepper motors are the most common spacecraft actuators.

The staggered posicast filtering technique of the present invention may also be used to precess satellites with thrusters while exciting minimal nutation, or slew stepper motor controlled gimbaled payloads with minimal residual flexing. The present invention may also be used in a feedback role, in a manner such that a single staggered posicast filter is used in the feedback path of gimbaled payloads.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
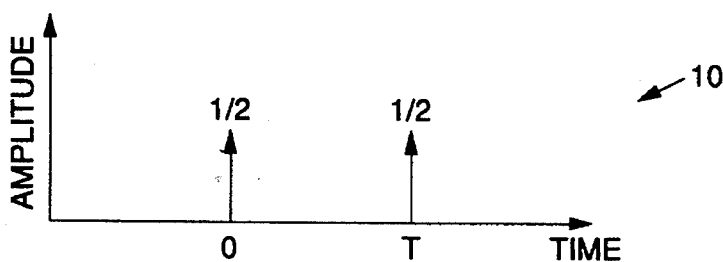
FIG. 1 illustrates an amplitude versus time plot for the impulse response of a conventional single posicast filter.

The present invention is a method 30 for filtering actuator commands 41 in a satellite control system 40 (FIG. 8), for example, to reduce resonant mode excitation despite uncertain knowledge of the resonance frequencies, due to parameter variations, and nonlinearities, and the like. The present method 30 filters the actuator commands 41 with staggered proportional plus delay (posicast) filters 20 having distinct delay values chosen to provide a desired resonance attenuation over the resonance uncertainty range. The present staggered filtering method 30 is described below with reference to two-filter and three-filter implementations, and is contrasted with the results using a single filter 10, and comparable three-impulse and four-impulse filters such as are disclosed in the Singer et al. patent, and which are equivalent to cascading two or three identical posicast filters. The staggered filtering method 30 of the present invention may be extended to filter multiple resonances by cascading the staggered posicast filters 20 for each resonance. The present invention has wide application, such as in spacecraft precession and translation maneuvers, as well as gimbaled payload stepping. These applications are discussed more fully below.

Presented below is a discussion of the theory of posicast filters, and the staggered posicast filter 20 of the present invention is contrasted with conventional single posicast and repeated posicast filters 10, 10a. Thereafter, specific examples using the present staggered posicast filter 20 are described.

As described in the Cook article, a single posicast filter 10 designed for a resonance with a natural frequency $\omega_n$ and damping of $\zeta$ has the form:

$$F(s, T) = \frac{1}{1+F_0} + \frac{F_0}{1+F_0} e^{-sT_d/2}$$

where $$F_0 = e^{-\zeta \pi \sqrt{1-\zeta^2}} \quad T_{d/2} = \pi/\omega_n \sqrt{1-\zeta^2} .$$

for simplicity, and because the damping is very small for many systems of interest, it is assumed in the examples that $\zeta=0$, which simplifies the form of the filter 10 to:

$$F(s, T) = \frac{1}{2} + \frac{1}{2} e^{-sT} \quad T = \pi/\omega_n.$$

This restriction is intended only to simplify the following description. In the description below, the more general form of $F(s,T)$ may be inserted in place of the simple form to obtain a more general case. Filtering a time signal with $F(s,T)$ is equivalent to convolving the time signal with an impulse sequence $\delta(0)/2+\delta(T)/2$, where $\delta(T)$ represents an impulse function at time T. Graphically, this time signal is shown in FIG. 1, which illustrates an amplitude versus time plot for the single posicast filter 10.

$$G(s, T_1, T_2) = \left( \frac{1}{2} + \frac{1}{2} e^{-sT_1} \right) \left( \frac{1}{2} + \frac{1}{2} e^{-sT_2} \right) =$$

$$\left( \frac{1}{4} + \frac{1}{4} e^{-sT_1} + \frac{1}{4} e^{-s(T_1+T_2)} \right)$$

Figure 2:
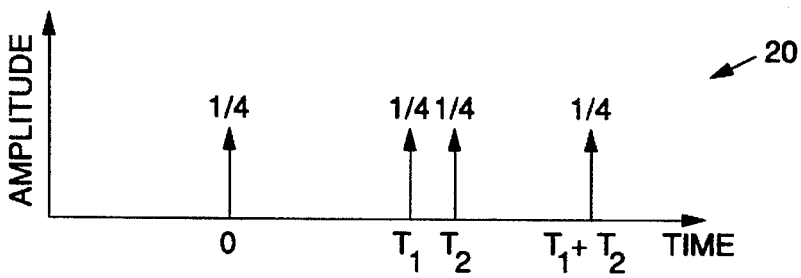
FIG. 2 illustrates an amplitude versus time plot for a staggered posicast filter in accordance with the present invention.

Filtering a time signal with this filter 10 is equivalent to convolving it with a time sequence $\delta(0)/4+\delta(T_1)/4+\delta(T_2)/4+\delta(T_1+T_2)/4$. Graphically, this time sequence is shown in FIG. 2, which illustrates an amplitude versus time plot for the staggered posicast filter 20 in accordance with the present invention.

Figure 3:
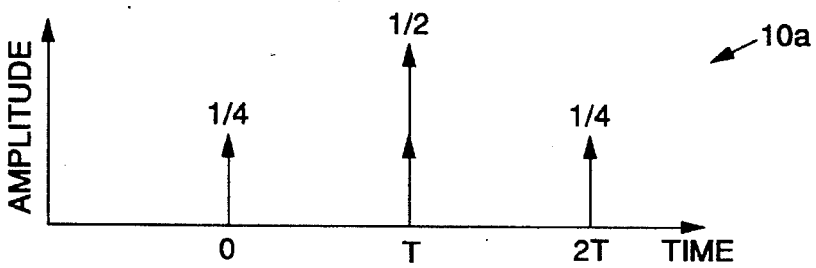
FIG. 3 illustrates an amplitude versus time plot for a conventional repeated posicast filter.

In the special case that $T_1=T_2=T$, the two central impulses coincide, yielding a three-pulse pattern described in the Singer et al. patent. FIG. 3 illustrates an amplitude versus time plot for a repeated posicast filter 10a as taught by the Singer patent.

In the special case where $T_1=0$, the first and second impulses coincide, as do the third and fourth, yielding the same impulse pattern of FIG. 1. Therefore, the filters 10, 10a of FIGS. 1 and 3 are special cases of the filter 20 of FIG. 2. The focus of the present invention is that there are benefits to the pattern of the staggered posicast filter 20 of FIG. 2 when it does not coincide with the filters 10, 10a of FIGS. 1 or 3. This is demonstrated by the frequency response curves shown in FIG. 6.

Figure 4:
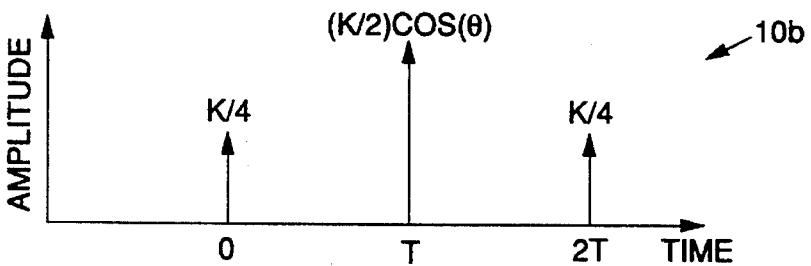
FIG. 4 illustrates an amplitude versus time plot for a conventional modified repeated posicast filter.

If the central impulse in FIG. 3 is reduced in amplitude from ½ to something less, a modified repeated posicast filter 10b derived in the Singer et al. paper is obtained. To help compare this filter 10b with the present filter 20, this amplitude is expressed as K(½)cos(θ), where 0<cos(θ)<1. The multiplicative gain, K=2/(1+cos(θ)), renormalizes the filter 10b to unit DC gain. FIG. 4 illustrates an amplitude versus time plot for the modified repeated posicast filter 10b taught in the Singer paper.

Figure 5:
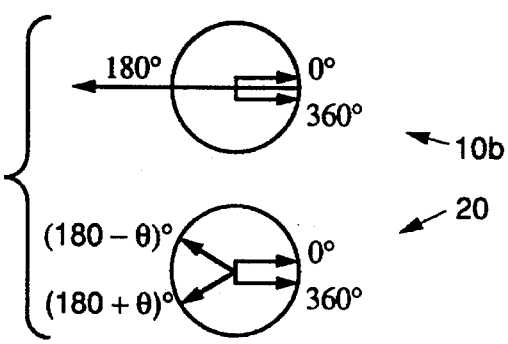
FIG. 5 shows the relationship between the conventional modified repeated posicast filter and that of the present invention.
Figure 6:
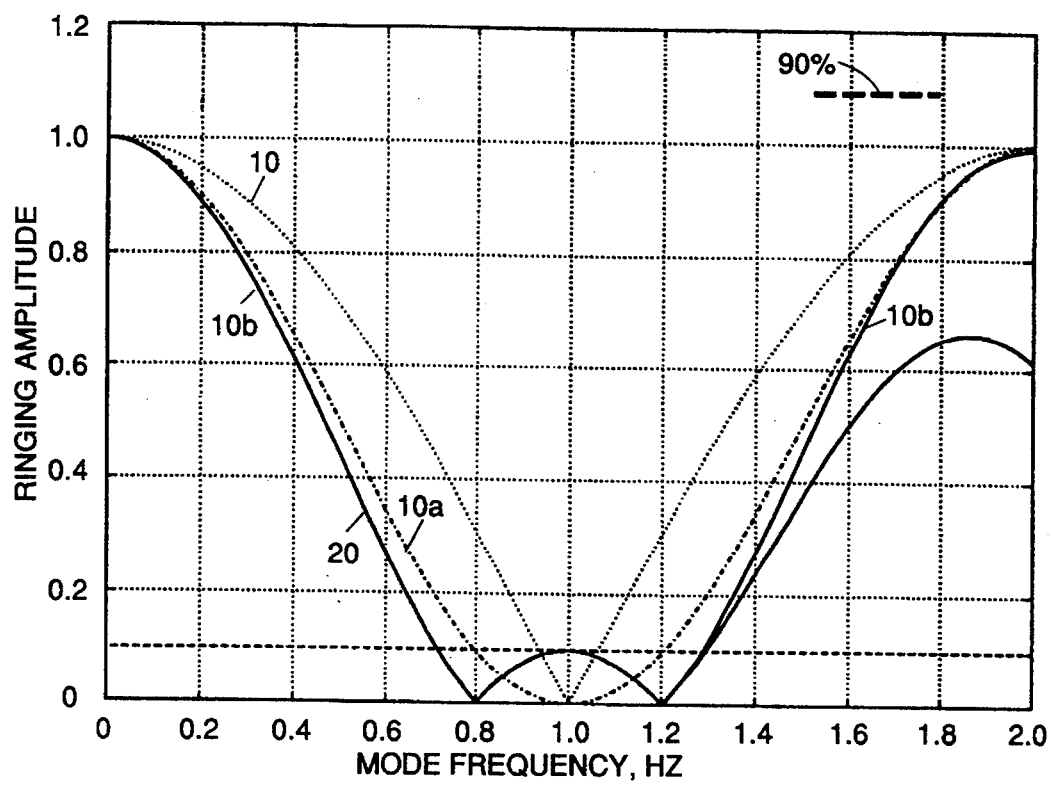
FIG. 6 compares the attenuation provided by a two-filter staggered posicast filter of the present invention to conventional filtering schemes.

As shown in FIG. 6, the frequency response curve of the modified repeated posicast filter 10b is very similar to that of the filter 20, especially at lower frequencies. Why this is so may be seen with reference to FIG. 5. FIG. 5 is a vector diagram showing the response of a resonance to an impulse passed through the filters 20, 10b at a nominal resonance frequency. The interpretation of the vector diagram is that the sinusoidal impulse response of a resonance is represented by a rotating vector drawn from the origin, that rotates counterclockwise at an angular rate equal to the resonance frequency, and whose magnitude is proportional to the amplitude of the resonance. The amplitude and phase of the resonant response to a series of impulses may be determined by vectorially summing the vectors corresponding to the impulses. Typically, the first impulse is shown aligned with zero phase, and later impulses are shown at a phase equal to their delay times the resonance frequency. Such diagrams are used to analyze the effect of FIR input shaping in the Singer paper and elsewhere, e.g., in B. K. Ericson's paper "Input Attenuation Functions Improve Servomechanism Performance", Electronics and Control Instrumentation, November 1971, pp. 144–156.

FIG. 5 compares the impulse response for the present filter 20 and the modified filter 10b. The main difference is that the present filter 20 has vectors of length ¼ that straddle 180° phase by an angle θ, and the modified filter 10b has a single vector at 180° phase with magnitude Kcos(θ)/2. At this frequency, the vector sum of either filter 20, 10b is nearly the same—a small residual at zero phase. From FIG. 5, it can be seen that these filters 20, 10b have zeros at frequencies slightly above and below the nominal frequency. To see this, consider the case where the resonant frequency is slightly increased or reduced, so that the phase of the vectors near 180° in FIG. 5 are advanced or retarded by θ, and the phase of the vectors at 360 degrees are advanced or retarded by 2θ. For these cases, it can be seen that the vector sums would be exactly zero for the modified filter 10b, and very nearly so for the present filter 20. It can be further seen that, if the resonance frequency were to double, the modified filter 10b would have unit response (no resonance attenuation at all); the vector at 180° would move to 360°, the vector at 360° would move to 720°, and all three vectors would be coaligned. This is not the case for the present filter 20; the vector sum would be very nearly (½)(1+cos(2θ), providing some attenuation, as shown in FIG. 6.

FIG. 6 compares the attenuation provided by a two-filter staggered posicast filter 20 of the present invention to conventional filters 10, 10a, 10b. As shown in FIG. 6, the requirement is 90% attenuation over a frequency range centered at 1 Hz, and filter delays were chosen accordingly; 0.5 seconds for the single and repeated posicast filters 10, 10a, and 0.4 and 0.6 seconds for the staggered posicast filter 20. The staggered posicast filters 20 used in the present invention are finite impulse response (FIR) filters, not infinite impulse response (IIR) filters typically used as filters in control systems. The frequency range over which the staggered posicast filter 20 and modified repeated posicast filter 10b meet the 90% attenuation requirement is 43% wider than for the repeated posicast filter 10a, even though the total filter delay (1.0 seconds) is the same for each.

Key advantages of the present filter 20 over the modified repeated posicast filter 10b are its larger effective quantization, its greater attenuation of high frequencies, and its use of identical amplitude impulses. These are all significant advantages for satellite applications.

A large effective quantization is important when using the present invention with stepper-motor controlled gimbals. Stepper motors are widely used in satellites because they do not require power to maintain position. For example, the current HS-601 series of geosynchronous satellites manufactured by the assignee of the present invention may have as many as 12 stepper-motor driven axes: 2 solar drives, two 2-axis reflector drives, and two 3-legged momentum wheel platforms. The undesired excitation of flexible modes by the inherently abrupt action of stepper motor steps is also a common concern.

An axis reposition of any multiple of four steps may be exactly accomplished using the filter 20, for any desired uncertainty range of frequencies. The modified repeated posicast filter 10b requires at least 7 steps (a 2-3-2 step sequence), and this presumes that a resonance error corresponding to one step is acceptable (calculated from equation 18 in Singer's paper). This makes the filter 20 more attractive than the modified repeated posicast filter 10b for stepper motor control.

The fact that the modified repeated posicast filter 10b provides no resonance attenuation whatsoever at a frequency twice that of the nominal frequency is undesirable as well. Any physical system has an infinite number of resonances, and structural systems are all too likely to have a significant resonance at twice the frequency of the primary resonance (the second harmonic). This is also an advantage for the present filter 20 versus the modified repeated posicast filter 10b.

The fact that the filter 20 convolves the command signal with four identical impulses is also useful for thruster control. The amount of impulse a thruster delivers is a nonlinear function of commanded on-time due to valve opening/closing effects. When a maneuver is split into four equal parts, as by the filter 20, resonance excitation due to each pulse will not be affected by this; each pulse will lose the same amount due to valve effects. When the pulses are of different length, as with the conventional filters 10a, 10b, the non-proportionality of effective on-time with commanded on-time reduces the effectiveness of the resonance reduction unless it is compensated for.

By staggering the filter delays, the filter 20 increases the attenuation frequency range, and reduces the high-frequency excitation. This provides for a 40% improvement over the repeated posicast filter 10a when designing for 99% attenuation. The required separation is roughly proportional to the square root of the allowable residual. Thus, to go from the 10% residual of FIG. 6 to a 1% residual, the offset of the delays from the delay of the single posicast filter 10 is reduced by the square root of 10%/1%, or from 0.1 to 0.0316, yielding delay times of 0.468 and 0.532 seconds.

Figure 7:
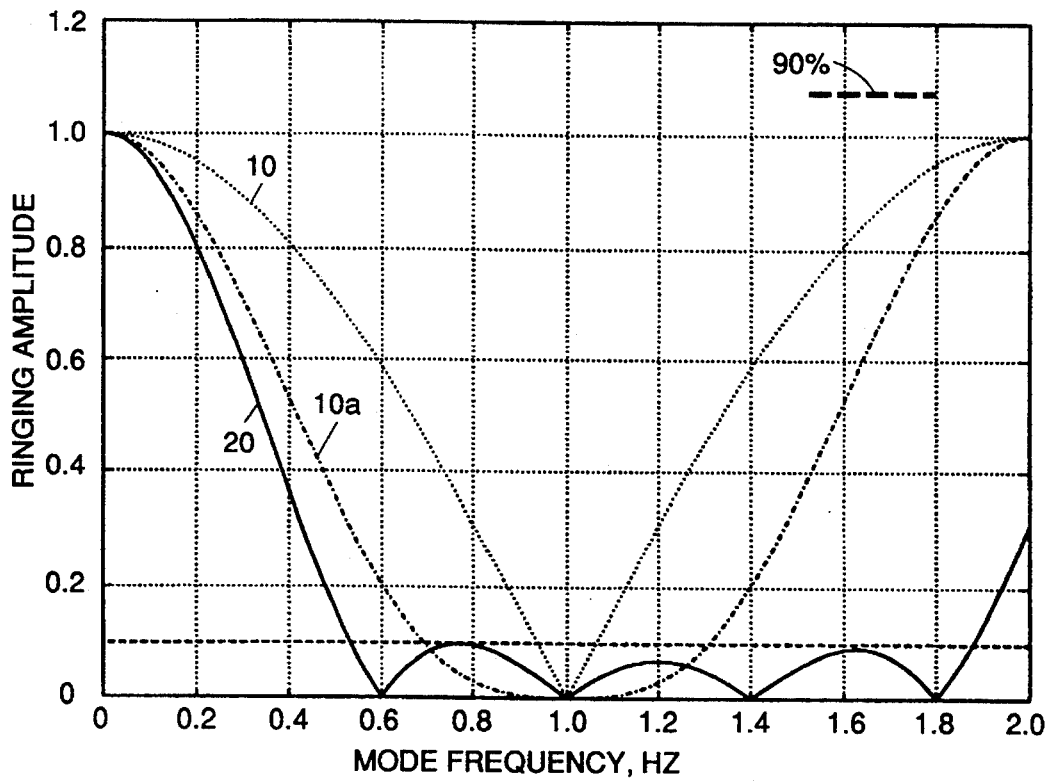
FIG. 7 compares the attenuation provided by a three-filter staggered posicast filter of the present invention to conventional filtering schemes.

For attenuation over a wider range, the Singer et al. patent suggests convolving an input sequence with an impulse pattern $\delta(0)/8+3\delta(T)/8+3\delta(2T)/8+\delta(3T)/8$. This is simply three posicast filters in series: $F(s,T)F(s,T)F(s,T)$. FIG. 7 compares the attenuation provided by a two-filter staggered posicast filter 20 to conventional filtering schemes. As is shown in FIG. 7, a specified attenuation is met over a wider range by staggering the filter delays. FIG. 7 shows that the staggered posicast filter 20 meets the attenuation requirement over the widest range.

As is shown in FIG. 7, the three repeated filters 10a provide 90% attenuation over less than 9% more frequency range than the staggered filter 20 shown in FIG. 6, at the cost of 50% more movement delay, and twice as fine quantization. Also, when three staggered filters 20 are used with the same maximum delay and granularity as the repeated posicast filters, and is designed for 90% attenuation (filter delays of 0.3, 0.5, 0.7 seconds), much more frequency range coverage is obtained.

Figure 8:
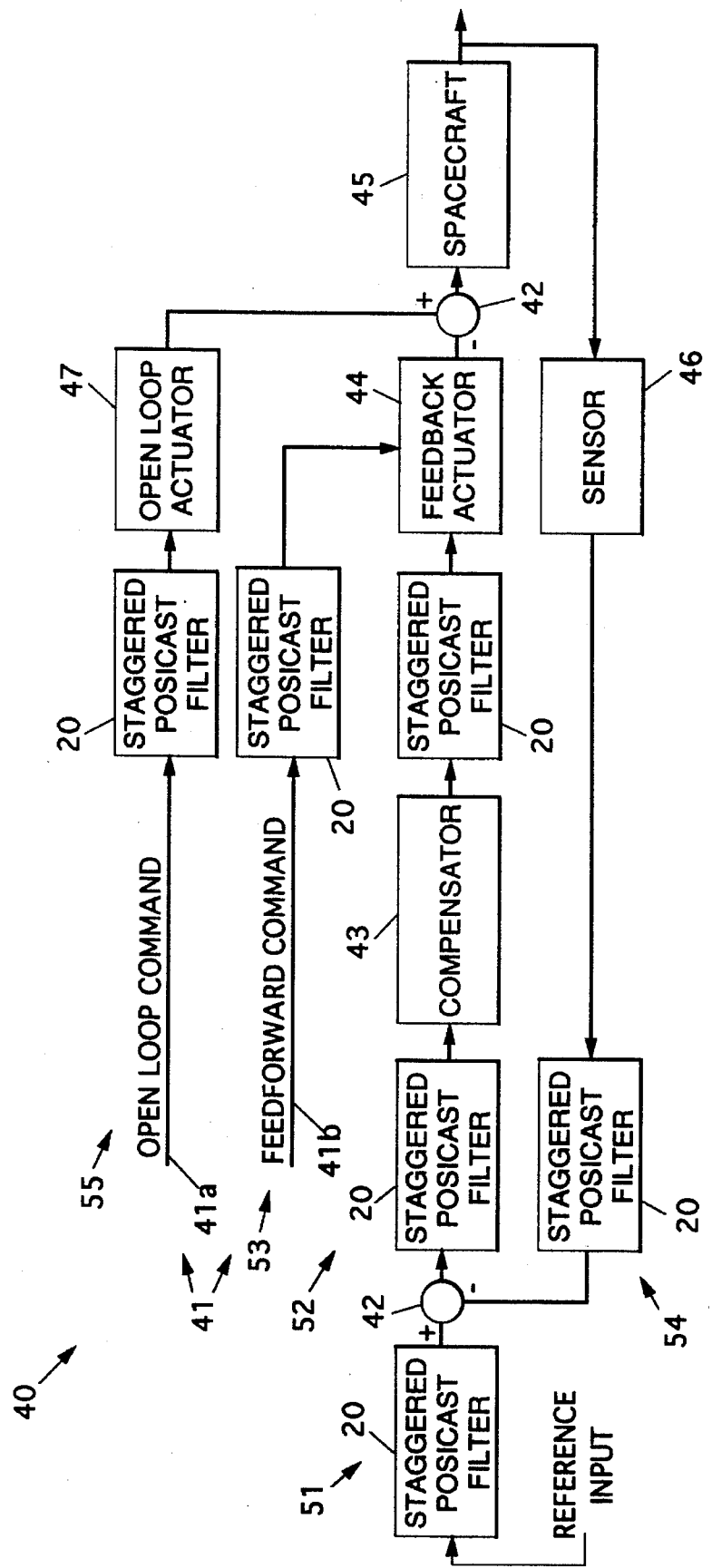
FIG. 8 is a system block diagram illustrating an exemplary satellite control system employing staggered posicast filters in accordance with the principles of the present invention.

Referring to FIG. 8, various applications for the present invention are described. FIG. 8 is a block diagram illustrating an exemplary satellite control system 40 employing staggered posicast filters 20 in accordance with the principles of the present invention. The control system 40 comprises a sensor 46 that is part of a disturbance path 52 that is coupled to a spacecraft 45. A summing device 42 is coupled to receive a reference input signal 48 and a signal from the sensor 46. An open loop control path 55 comprising an open loop actuator 47 is provided that receives an open loop command 41a. A feedforward path 53 provides a feedforward command 41b. The primary control portion of the system 40 comprises a disturbance path 54 that includes a compensator 43 and a feedback actuator 44 coupled between the two summing devices 42. The staggered posicast filters 20 of the present invention may be employed at each of the locations identified in FIG. 8 either singularly or in tandem, depending upon the requirements of the control system 40. The staggered posicast filters 20 may be employed in the reference signal path 51, in the feedback path 52, in the feedforward. path 53, in the disturbance path 54, or in the input path 55 to an open loop actuator 47, for example, as is illustrated in FIG. 8.

Another application of the staggered posicast filter 20 is for a stepper controlled gimbal slewing flexible element. The typical requirement for the flexible element is to take a certain number of steps in a short amount of time, while keeping flexible mode excitation at a reduced level. Motions are executed using movement commands 41 having an integer number of steps, due to constraints of the stepper motor. The total delay in the cascaded staggered posicast filters 20 (sum of the delay for each filter) governs the total time required for the maneuver, and the granularity of each filter 20 influences the coarseness of control induced thereby, from the integral step number constraint. For movements that require many steps, delay and granularity are of less concern, since the granularity is small with respect to the required motion, and the maneuver likely requires multiple resonance periods in any event. Flexible elements typically have an infinite number of resonances, while posicast filters are typically designed only for a fundamental mode. The staggered posicast filter 20 has more high-frequency attenuation than a repeated posicast filter 10a and provides a significant benefit.

For fine pointing, a single posicast motion requires at least two steps, and two conventional cascaded posicast filters require motion in units of four steps, and three conventional cascaded filters require motion in units of eight steps, and therefore pose problems. Also, cascaded posicast motions inherently take at least one resonance period to execute, particularly if the filter is used in a feedback path 52, since response time is affected.

For typical microprocessor-sampled data systems, the delay elements in the staggered posicast filters 20 may be mechanized as shift registers. Each delay may be mechanized as a circular buffer whose number of elements equals the number of sample periods in the delay. The processing required per sample period for a circular buffer is to read from the pointer address location to output location, store from input location to pointer address location, and advance the pointer, wrapping to start when the end is reached. Cascaded staggered posicast filters 20 may be implemented as cascaded buffers, or as a buffer long enough to provide the sum of the individual delays, with multiple pointers to tap the output with different delays.

The consequences of granularity may be mitigated by schemes that accumulate and "leak" signals through the system. This reflects two considerations: that given sufficient time, the resonance excitation due to prior movements usually decays due to system damping, and the resonance excitation induced of a single step is likely to be acceptable. For example, each staggered posicast filter 20 may be implemented as $(\frac{1}{2})(1+e^{-sT})$. That is, at each filter 20 the input signal is first scaled by ($\frac{1}{2}$) and the integer part is passed through the proportional plus delay section (which multiplies them together), while the remainder is retained to be combined with later commands. A refinement of this is that once sufficient time has passed since a command has been sent through a given filter 20, to pass the residual around that the filter 20.

Further modifications to the staggered posicast filter 20 may be used to speed up filter response. For example, the input stage of each filter 20 may be caused to round up, and an extra step may be sent through the delay path. This extra step may be tracked by sending an "anticipatory step" through the delay path (never allowing more than one to be in that buffer) when the unmatched step is sent through the direct path. This step represents the appropriate time to take another step. If another step command is received while the anticipatory step is in transit, the anticipatory step becomes a real step, and the command step is credited. Otherwise, when it reaches the delay output, the anticipatory step is inverted and sent as a "negative anticipatory step" through the delay path. If a negative step command comes in while the negative anticipatory step is in transit, the negative step command becomes a real command, and the negative step is credited; otherwise, it is again inverted and sent into the delay path when it reaches the delay output. If the delay is mechanized as a circular buffer with more than enough bits per location to handle the desired number of steps per sample period, the anticipatory step may be represented as an impossible number of steps (to distinguish if from a real step). A further refinement is to track the expected amplitude of the residual vibration (devalue the anticipatory step at each pass, storing its value in a side variable, and when it becomes a real step (which is a single step), entering the difference between the step taken and the modeled value of the anticipatory step into the delay path as the new estimate of the resonance state. The net result is that steps is taken in a fashion designed to minimize the expected vibrational energy in the system.

A second application described below relates to satellite stationkeeping maneuvers. For stationkeeping maneuvers, quantization issues are different than they are for stepper motor applications. Also, the commands are typically open loop, so the command profile is prepared with knowledge of the future. Typically, a goal is to make a desired velocity change with minimal fuel, in a short time to reduce impacts such as ground operator time, degraded pointing, thruster life, gyro life, and suboptimal timing of the orbital correction, and with minimum flexible mode excitation to meet attitude control requirements and minimize fuel used to steady the vibrating satellite.

Within limits, thrusters produce a fixed amplitude, variable width output (variable amplitude can be simulated by duty cycle modulation, but this significantly reduces fuel efficiency). For HS-601 satellites, the maneuver of most concern is an east/west maneuver, and the total maneuver time involved is in the range of ¼ to ½ of the posicast delay period (total burn time 1–3 seconds and, posicast period of 3.5–7 seconds (fundamental mode period of 7 seconds (3-panel) and 14 seconds (4-panel)).

The desired velocity change ($\Delta V$) signal, for example, a 3 second pulse on a nominal 14 second modal period, if passed through conventional posicast filters 10, 10a, result in actuator commands of variable amplitude, which is not desirable. Since the desired result is $\Delta V$, however (total area under the input signal), the input may be scaled up in amplitude commensurably. Thus, the desired input may be viewed as a linear acceleration four times what the thrusters actually produce, for ¾ second, then passed through two repeated or staggered posicast filters 20, resulting in four distinct realizable pulses, as long as the delay separation is large enough that the pulses do not overlap. In the repeated pulse case, the center pulse is twice the amplitude of the other two, and the pulse is treated as a width modulated rather than an amplitude modulated pulse, and the pulse is made twice as long, with half the amplitude, and with the same center, as the pulse that would be obtained directly. This is equivalent to staggering the delays just enough that the center two pulses touch.

The most critical HS-601 case, for example, has been with a 14 second flexible mode, and a 5 second maneuver. Referring again to FIG. 5, two staggered posicast filters 20 for 10% residual results in filter delays of (0.4*14½)=2.8 seconds and (0.6*14½)=4.2 seconds, which means that the total burn time is 4*(4.2−2.8)=4*1.4=5.6 seconds before the center two pulses touch, so for all 4-panel cases of concern, the staggered posicast filters 20 yield a different solution than the solution produced in accordance with the teachings of the Singer et al. patent.

When using the staggered posicast filters 20, a 14 second flexible mode, and 10% residual vibration, the firing pattern includes four pulses of equal width, starting at t=0, 2.8, 4.2 and 7 seconds. A 10% residual vibration relates the result of a single pulse at t=0, with the same width, but four times the amplitude, of the actual pulse. When the pulse widths are significant with respect to the modal frequency, the relative size of the residual for a single pulse with four times the width of one of the four pulses is slightly different, but FIG. 5 provides a fairly good approximation.

Thus there has been described a new and improved method of using staggered posicast filters in satellite control systems, and the like, that provides for a reduction in resonances produced in the satellite systems during maneuvers. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A method for processing actuator commands applied to actuators of a satellite system to reduce resonant mode excitation in the satellite system for a mode of variable or uncertain frequency, said method comprising the steps of:

generating actuator commands that are to be applied to actuators of the satellite system;

filtering the actuator commands with a plurality of cascaded staggered proportional plus delay filters having delay values that are distinct, yet close enough together so that the frequency response between first zeros of the proportional plus delay filters provides a predetermined level of resonance reduction over at least the frequency uncertainty range of the mode, and such that the filter impulse response has a set of equal impulses; and applying the filtered actuator commands to the actuators of the satellite system.

2. The method of claim 1 wherein the actuator commands further comprise movement commands and wherein the filtering step comprises the step of filtering movement commands through at least two proportional plus delay filters having staggered zeros bracketing an expected frequency of resonance, to provide a predetermined level of attenuation of the resonance within the frequency uncertainty range.

3. A filter for processing actuator commands provided to an actuator of a satellite system to reduce resonant mode excitation in the satellite system for a mode of variable or uncertain frequency, said filter comprising:

a filter impulse response having a set of equal impulses;

said filter having a predetermined level of resonance reduction over at least the frequency uncertainty range of the mode; and wherein said filter comprises a plurality of cascaded posicast filters whose delay values are distinct, yet close enough together so that the frequency response between first zeros of the posicast filters provides at least the predetermined level of resonance reduction.

4. The filter of claim 3 comprising at least two cascaded posicast filters whose lowest frequency zeros are logarithmically evenly spaced across a frequency range centered on an expected frequency of resonance.

5. The filter of claims 4 where the actuator is a stepper motor.

6. The filter of claims 4 where the actuator is a thruster.

7. The filter of claims 3 where the actuator is a stepper motor.

8. The filter of claims 3 where the actuator is a thruster.

9. The filter of claims 3 where the filter impulse response has at least four equal impulses.

* * * * *